M. A. O'CONNOR.
FRICTION DRAFT GEAR.
APPLICATION FILED JUNE 6, 1908.

1,200,642.

Patented Oct. 10, 1916.

Witnesses:
E. A. Volk.
A. G. Dimond.

Inventor.
Martin A. O'Connor,
by Wilhelm, Parker & Hard,
Attorneys.

UNITED STATES PATENT OFFICE.

MARTIN A. O'CONNOR, OF BUFFALO, NEW YORK, ASSIGNOR TO W. H. MINER COMPANY, OF CHICAGO, ILLINOIS, A CORPORATION OF ILLINOIS.

FRICTION DRAFT-GEAR 1,200,642.  Specification of Letters Patent.  Patented Oct. 10, 1916.

Application filed June 6, 1908. Serial No. 437,049

*To all whom it may concern:*

Be it known that I, MARTIN A. O'CONNOR, a citizen of the United States, residing at Buffalo, in the county of Erie and State of New York, have invented a new and useful Improvement in Friction Draft-Gears, of which the following is a specification.

This invention relates more particularly to improvements in that type of friction draft gears for railway cars which comprise friction blocks arranged to slide in an inclosing barrel or case in the direction of movement of the drawbar, a spring for opposing this longitudinal movement of the friction blocks, and a wedge which is actuated by the movement of the drawbar and forcibly spreads the friction blocks apart into contact with the surfaces of the barrel against which they slide to produce the friction for resisting the movement of the drawbar. In these gears as heretofore constructed, the required amount of friction can be secured by using a wedge of relatively low pitch, but if the pitch of the wedge is too low it will stick and will not release, or be restored to the initial position when the pressure thereon is relieved. On the other hand, if the wedge has pitch enough to properly release or be returned to the initial position when the pressure or draft is removed therefrom, then a gear having friction blocks or shoes of the ordinary sort will not develop the friction necessary to resist the maximum shocks to which it is subjected in use.

The object of this invention is to produce a friction draft gear of great capacity and of simple and strong construction in which the friction blocks and the coöperating faces of the barrel on which they slide are so shaped that they will offer the required frictional resistance to the movement of the drawbar and at the same time permit of the use of a wedge which will properly release itself.

Figure 1:
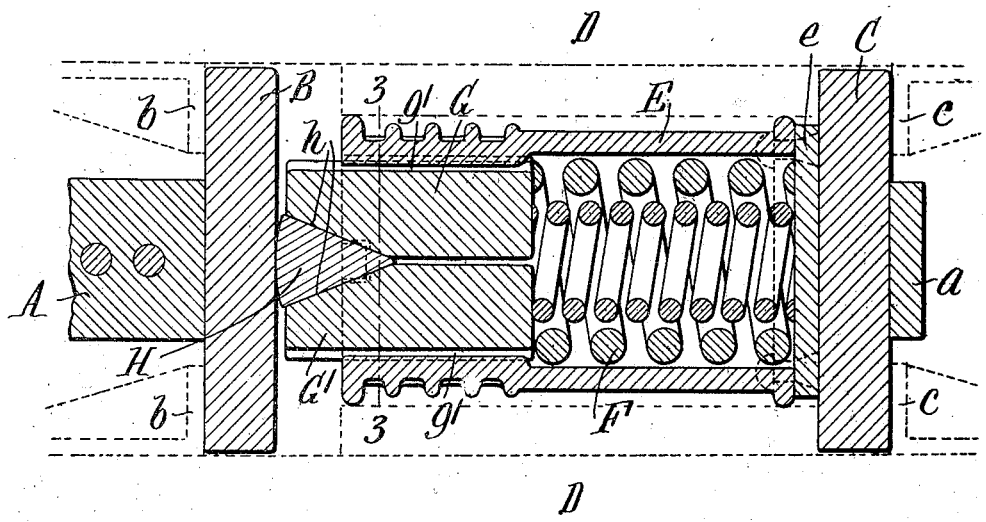
Figure 1:
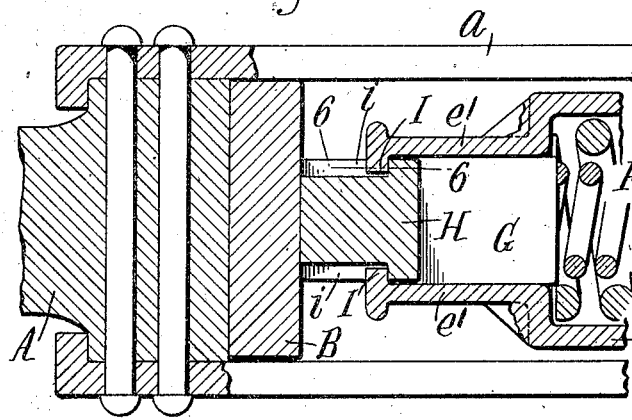
Figure 1:
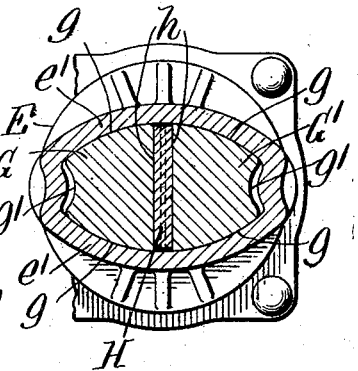
Figure 1:
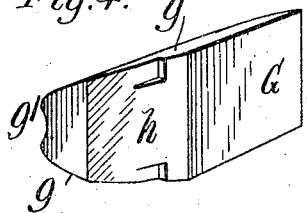
Figure 1:
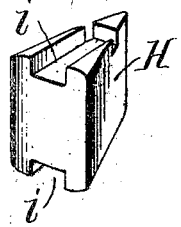
Figure 1:
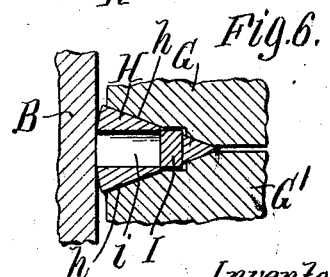

In the accompanying drawings: Figure 1 is a horizontal longitudinal section of a draft gear embodying the invention. Fig. 2 is a fragmentary vertical sectional elevation thereof. Fig. 3 is a cross-section thereof in line 3—3, Fig. 1. Fig. 4 is a perspective view of one of the friction blocks detached. Fig. 5 is a perspective view of the wedge detached. Fig. 6 is a fragmentary section of the wedge and friction blocks in line 6—6, Fig. 2.

Like letters of reference refer to like parts in the several figures.

A represents the rear end of the drawbar, *a* the draft yoke secured to and extending rearwardly from the drawbar, and B and C the front and rear movable followers which extend transvesely through the yokes and coöperate with front and rear stops or abutments *b* and *c* on the draft sills D to transmit the draft strains and buffing shocks to the draft sills. These parts may be of the usual or any suitable construction and operate in the usual manner.

E represents a barrel or case which is arranged within the yoke *a* between the followers B and C and bearing at one end against one of the followers. In the gear shown, the rear end of the barrel bears against the rear follower and is closed by a head or cover *e*. The barrel contains or incloses the spring and friction devices of the gear and the closed end thereof may be of cylindrical or other shapes suitable to form a spring chamber. The other or front end of the barrel is preferably open and has opposite walls *e'* which converge from the center toward the opposite sides of the barrel, thereby forming wedge pockets or cavities in the opposite sides of the barrel. The walls *e'* are preferably curved on the arc of a circle, ellipse, parabola, or other suitable curve.

F represents an ordinary double coil spring located in the spring chamber of the barrel.

G G' represent two friction blocks or shoes which are arranged to slide longitudinally in the wedge pockets of the barrel against the action of the spring F, which presses them forwardly in the barrel. The friction blocks are wedge-shaped in cross-section, having opposite faces *g* which converge toward the sides of the barrel and substantially conform in shape to the faces *e'* of the barrel so as to bear against said faces *e'* practically throughout their width. A clearance or space is left in the barrel between the outer narrow edge or apex *g'* of each friction block and the opposing portion of the wall of the barrel, as shown in Fig. 3, so that these parts cannot contact and take any of the lateral pressure of the friction blocks off of the friction faces $e'$ of the barrel.

H represents a wedge which is arranged between the friction blocks with its inclined faces bearing against opposite inclined faces $h$ on the friction blocks G G', preferably at their forward ends. The wedge is adapted to be forced or wedged between the friction blocks so as to spread the same apart laterally against the friction faces $e'$ of the barrel when the front follower B, against which the large end of the wedge bears, is pushed rearwardly or the barrel is pulled forwardly.

In the gear shown the wedge, friction blocks and spring are all inserted in the barrel through the rear end thereof before the rear head $e$ is secured in place, and lugs I are provided at the front end of the barrel which project into longitudinal slots $i$ in the sides of the wedge H and engage shoulders on the wedge at the rear ends of said slots to limit the forward movement of the wedge in the barrel and prevent the escape of the parts from the open front end of the barrel. Any other means could be employed for this purpose.

The operation of the gear is as follows: When the rear follower and barrel are pulled forwardly by the drawbar in drawing the car, or the front follower is pushed rearwardly by the drawbar in buffing, the friction blocks G G' will slide longitudinally in the barrel and compress the spring F, and the wedge H will also be forced inwardly between the coöperating inclined faces of the friction blocks G G' so as to forcibly spread these blocks apart laterally against the coöperating friction faces $e'$ of the barrel on which they slide. As the lateral movement of the friction blocks is resisted entirely by the converging friction faces $e'$ of the barrel the friction blocks will wedge between these faces and the friction thus caused between the contacting surfaces of the friction blocks and barrel will be much greater than could be obtained with a construction in which the friction blocks contact with friction faces arranged directly opposite thereto or perpendicular to the direction in which the friction blocks are spread by the wedge. As the walls $e'$ of the barrel are curved or approach each other toward the sides of the barrel, the tendency of the spreading friction blocks to stretch or distort the barrel laterally has the effect of straightening the walls $e'$ and drawing them more firmly in against the friction blocks, whereby the pressure is increased and is more evenly distributed throughout the width of the friction blocks, which results in greater efficiency.

In the construction illustrated, each friction block is wedge-shaped in cross-section, i. e., it has converging faces which wedge between two converging friction faces on the barrel, and two friction blocks are forced against each friction face of the barrel in the action of the gear. The barrel has no inwardly-projecting parts between the wedges, its friction faces forming with each other only concave angles and no reëntrant angles, so that the spreading of the friction blocks tends to straighten the walls of the barrel and thereby draw them more firmly in against the wedge faces of the friction blocks.

The invention is not limited to the constructions shown in the drawings. Two or more than two wedge-like friction blocks arranged as described relative to the barrel can be employed. The described construction of the friction blocks and barrel gives the required friction with the use of a wedge of sufficiently high pitch to insure its being properly released when the pressure or draft thereon is relieved.

I claim as my invention:

1. In a friction gear, the combination of a barrel, friction blocks which slide longitudinally in said barrel and have transversely converging faces which contact with corresponding transversely converging friction faces in said barrel, each friction face of the barrel engaging coöperating faces on two friction blocks, a spring for opposing the longitudinal movement of said friction blocks in said barrel, and a wedge for forcibly pressing said friction blocks laterally against said friction faces of the barrel, clearance spaces being left between the corners of said friction blocks and the angles between the friction faces of said barrel, whereby each friction block is wedged laterally between two converging friction faces in said barrel, substantially as set forth.

2. In a friction gear, the combination of a barrel having transversely converging interior friction faces forming concave angles only in the barrel, friction blocks which slide longitudinally in said barrel and each having transversely converging faces which contact with two converging friction faces of the barrel, a spring for opposing the longitudinal movement of said friction blocks, and a wedge for forcibly pressing said friction blocks laterally against said friction faces of the barrel, clearance spaces being left between the corners of said friction blocks and the angles between the friction faces of said barrel, whereby each friction block is wedged laterally between two converging friction faces in said barrel, substantially as set forth.

3. In a friction gear, the combination of a barrel, friction blocks which slide longitudinally in said barrel and have transversely converging curved faces which contact with corresponding transversely converging curved friction faces in said barrel, a spring for opposing the longitudinal movement of said friction blocks, and a wedge for forcibly pressing said friction blocks laterally against said friction faces of the barrel, clearance spaces being left between the corners of said friction blocks and the angles between the friction faces of said barrel, whereby each friction block is wedged laterally between two converging friction faces in said barrel, substantially as set forth.

4. In a friction draft gear, the combination with a drawbar, movable followers and stops for said followers, of a barrel between said followers and movable with one of said followers, friction blocks which slide longitudinally in said barrel and have transversely converging faces which contact with corresponding transversely converging friction faces in said barrel, a spring for opposing the longitudinal movement of said friction blocks in said barrel, and a wedge which is movable with said other follower for forcibly pressing said friction blocks against said friction faces of the barrel, clearance spaces being left between the corners of said friction blocks and the angles between the friction faces of said barrel, whereby each friction block is wedged laterally between two converging friction faces in said barrel, substantially as set forth.

5. In a friction gear, the combination of a barrel, a pair of opposite friction blocks which slide longitudinally in said barrel and are substantially wedge-shaped in cross-section and contact with opposite friction faces in said barrel which converge toward opposite sides of the barrel, a spring for opposing the longitudinal movement of said friction blocks in the barrel, and a wedge arranged between and engaging said friction blocks for wedging them laterally between said converging friction faces of the barrel, clearance spaces being left between the wedge points of said friction blocks and the corners formed in the barrel by the converging friction faces thereof to allow such wedging action of said friction blocks, substantially as set forth.

6. In a friction draft gear, the combination with a draw-bar, movable followers and stops for said followers, of a barrel between said followers and movable with one of said followers, said barrel having a portion with opposite curved walls which converge toward opposite sides of the barrel, a pair of opposite friction blocks which slide longitudinally in said barrel and are substantially wedge-shaped in cross-section and have curved faces which contact with the curved walls of the barrel, a spring for opposing the longitudinal movement of said friction blocks in said barrel, and a wedge which is movable with said other follower for wedging said friction blocks laterally between said converging walls of said barrel, clearance spaces being left between the wedge points of said friction blocks and the corners formed in the barrel by the converging friction faces thereof to allow such wedging action of said friction blocks, substantially as set forth.

7. In a friction gear, the combination of a barrel, a pair of opposite friction blocks which slide longitudinally in said barrel and are substantially wedge-shaped in cross-section and contact with correspondingly shaped friction faces at opposite sides of the barrel, a spring for opposing the longitudinal movement of said friction blocks, a wedge arranged between and engaging said friction blocks for wedging them laterally between said friction faces of the barrel, one end of said barrel being open, and means on the open end of said barrel for preventing the escape of said wedge and friction blocks from the barrel, substantially as set forth.

8. In a friction gear, the combination of a barrel having a follower on one end thereof, friction blocks which slide longitudinally in said barrel and contact with corresponding friction faces at the sides of the barrel, a spring which presses the friction blocks longitudinally in the barrel, a wedge arranged between and engaging said friction blocks, for wedging them laterally against said friction faces of the barrel, and means on the ends of said barrel for preventing the escape of said movable parts from the barrel.

9. In a friction gear, the combination of a case member, friction blocks slidable within and against the same, a wedge for spreading said friction blocks, a spring pressing the friction blocks forwardly in the case member, and means on said case member holding said wedge from outward movement, whereby said parts are held against each other irrespective of the actuating elements of the gear.

Witness my hand, this 3rd day of June, 1908.

MARTIN A. O'CONNOR.

Witnesses:
C. W. PARKER,
C. B. HORNBECK.